March 21, 1939.  O. H. MENNING  2,151,640
DEMOUNTABLE VEHICLE BODY
Filed Oct. 7, 1937  5 Sheets-Sheet 1

Inventor
Otto H. Menning
By
Edward V. Hardway
Attorney

March 21, 1939.  O. H. MENNING  2,151,640
DEMOUNTABLE VEHICLE BODY
Filed Oct. 7, 1937   5 Sheets-Sheet 2
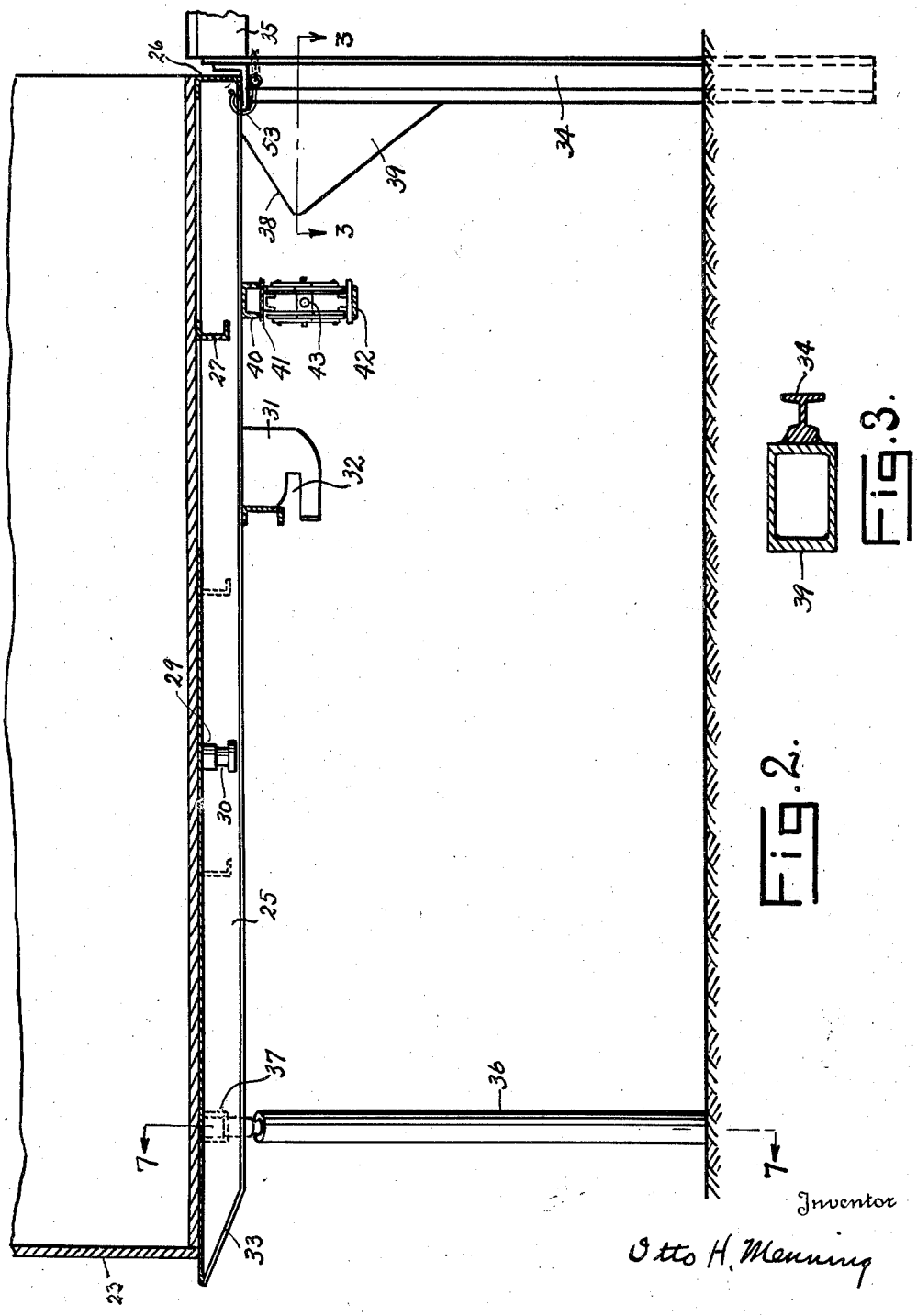

March 21, 1939. O. H. MENNING 2,151,640
DEMOUNTABLE VEHICLE BODY
Filed Oct. 7, 1937 5 Sheets-Sheet 3

Inventor
Otto H. Menning
By Edward V. Hardway
Attorney

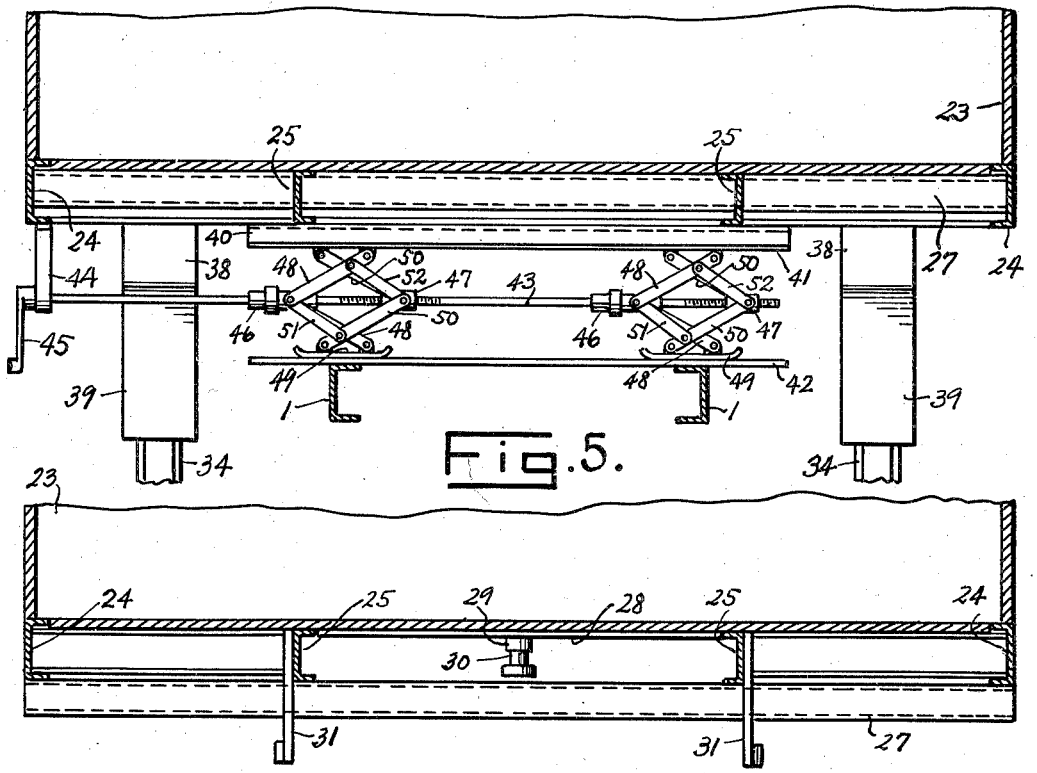
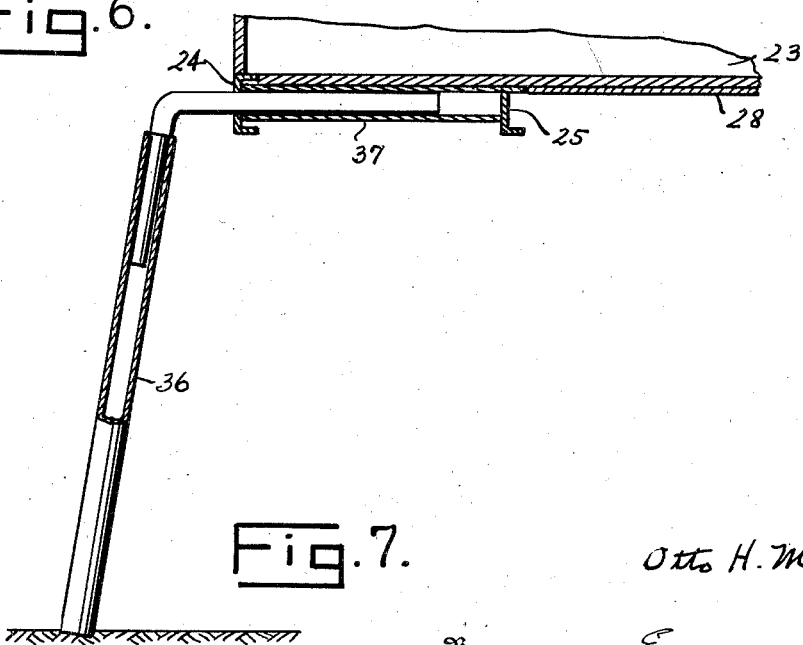
Inventor
Otto H. Menning
By
Edward V. Hardway
Attorney

March 21, 1939. O. H. MENNING 2,151,640
DEMOUNTABLE VEHICLE BODY
Filed Oct. 7, 1937 5 Sheets-Sheet 5

Inventor
Otto H. Menning
By Edward V. Hardway
Attorney

Patented Mar. 21, 1939

2,151,640

UNITED STATES PATENT OFFICE 2,151,640

DEMOUNTABLE VEHICLE BODY

Otto H. Menning, Houston, Tex., assignor to Gordon, Sewall & Co., Houston, Tex., a corporation of Texas Application October 7, 1937, Serial No. 167,778

8 Claims. (Cl. 296—35)

This invention relates to a demountable vehicle body.

It is an object of the invention to provide a demountable vehicle body particularly adapted for use on trucks for conveying freight or merchandise and the invention embodies means on the body as well as on the truck whereby the body may be securely mounted and maintained on the truck or detached therefrom, thus releasing the truck for use while the body is being loaded or unloaded. In handling merchandise or freight it is desirable that the body be located adjacent the loading platform while being loaded or unloaded, and that the truck itself be detached therefrom during the loading or unloading period, so that the truck may be in the meantime used for other purposes.

The transporting equipment may thus employ only a single truck for use in connection with a number of bodies to the end that the truck will not stand idle while the body is standing at the rack or loading platform for loading and unloading purposes.

It is a further object of the invention to provide a demountable vehicle body equipped with means whereby the same may be readily mounted on and anchored to the truck chassis so as to form with the truck a complete vehicle for the transportation of merchandise and for similar uses.

With the above and other objects in view, the invention has particular relation to certain novel features of construction, operation and arrangement of parts, an example of which is given in this specification and illustrated in the accompanying drawings, wherein:

Figure 2 shows a fragmentary longitudinal sectional view of the body mounted adjacent the loading platform for loading or unloading and with the truck detached and removed.

Figure 3 shows a cross sectional view taken on the line 3—3 of Figure 2.

Figure 5 shows a cross sectional view taken on the line 5—5 of Figure 4.

Figure 6 shows a cross sectional view taken on the line 6—6 of Figure 4.

Figure 7 shows a fragmentary horizontal sectional view taken on the line 7—7 of Figure 2.

Figure 1:
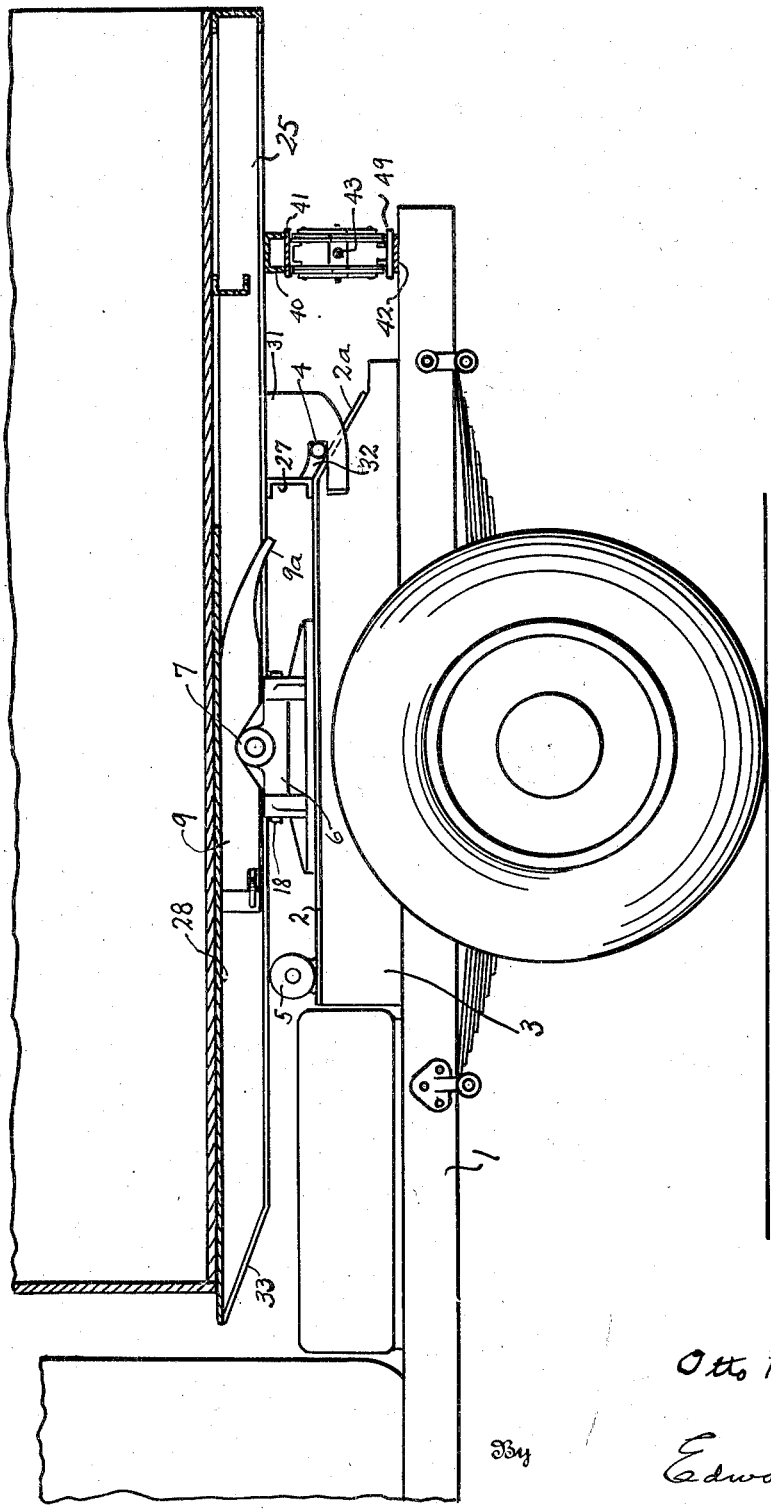
Figure 1 shows a fragmentary side view of the truck showing the body mounted thereon and in section.

Referring now more particularly to the drawings, wherein like numerals of reference designate similar parts in each of the figures, the numerals 1, 1 designate the side members of the truck frame. Mounted on the rear ends of these side members is the horizontal platform 2, which is elevated above said side members by means of the side beams 3. The rear end 2a of the platform declines rearwardly and anchored to and extending out laterally from the declining portion 2a are the anchor arms 4, 4 whose free ends are retracted. On the forward end of the platform 2 are the lateral extended transverse rollers 5, 5 provided for a purpose to be hereinafter stated.

Figure 8:
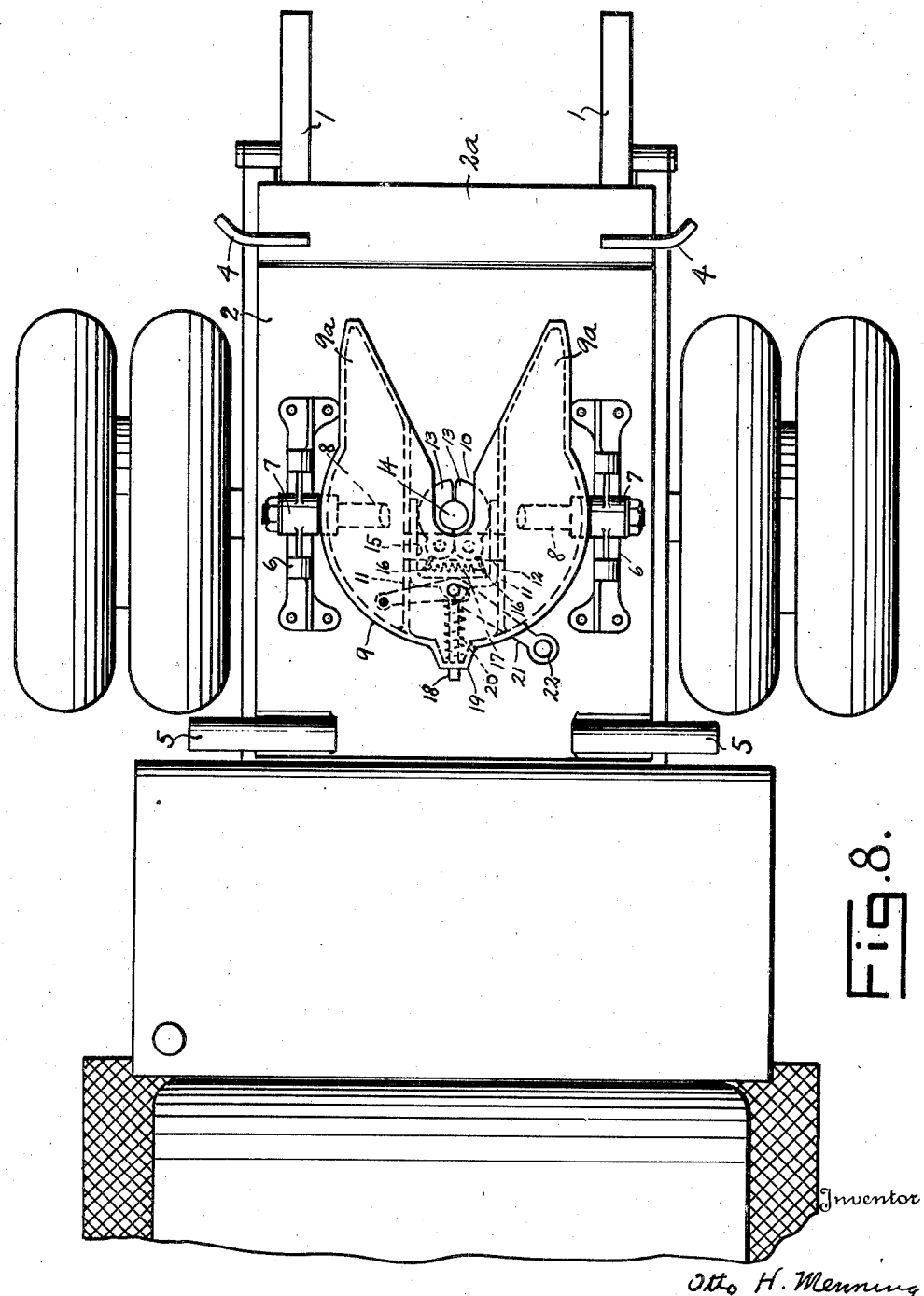
Figure 8 shows a fragmentary plan view of the rear end of the truck.

Secured to and upstanding from opposite sides of the platform 2 are the brackets 6, 6 having the centrally located bearings 7, 7 which are transversely aligned and rotatably mounted in the bearings 7 are the inwardly extended stub shafts 8, 8 to the inner ends of which are secured the lower fifth wheel 9, which is thus mounted to pivot about a transverse axis. The fifth wheel has the rearwardly extended slot 10 which diverges rearwardly, said fifth wheel having the rearwardly extended downwardly curved wings 9a, 9a on opposite sides of said slot as more accurately shown in Figures 1 and 8. The lower fifth wheel 9 has the longitudinal, vertical, webs 11, 11, spaced apart on opposite sides of the slot 10 forming guides. These guides are connected by a transverse cross bar 12. There are the arcuate bearing segments 13, 13 whose forward ends are pivoted to the cross bar 12. These segments confront each other and when closed, form a bearing 14. They are normally maintained in closed position by a U-shaped clamp 15, which is fitted between the guides 11, 11, and which, when in active position, maintain the segments 13 in closed position The pivoted end of the segments 13 have the forwardly extended arms 16, 16 which are connected by a pull spring 17, with the segments 13, 13 when the clamp 15 is released therefrom. The clamp 15 has an integral forwardly extending rod 18, which extends through the bearings 19 in the forward end of the lower fifth wheel 9 and a coil spring 20 surrounds said rod and is interposed between said clamp and the bearing 19 whereby the clamp is normally held in active position, as shown in Figure 8, to hold the bearing segments 13, 13, together. A release lever 21 is pivoted at one end to the lower fifth wheel 9 and has a sliding pivotal connection with the clamp 15 with its free end formed into an eye 22. A cable (not shown) may be tied to said eye through which the lever 21 may be pulled to release the clamp 15 from the bearing sections 13 to permit the sections to open. The lower fifth wheel 9 and the appendants thereof herein above described are of conventional construction.

Figure 4:
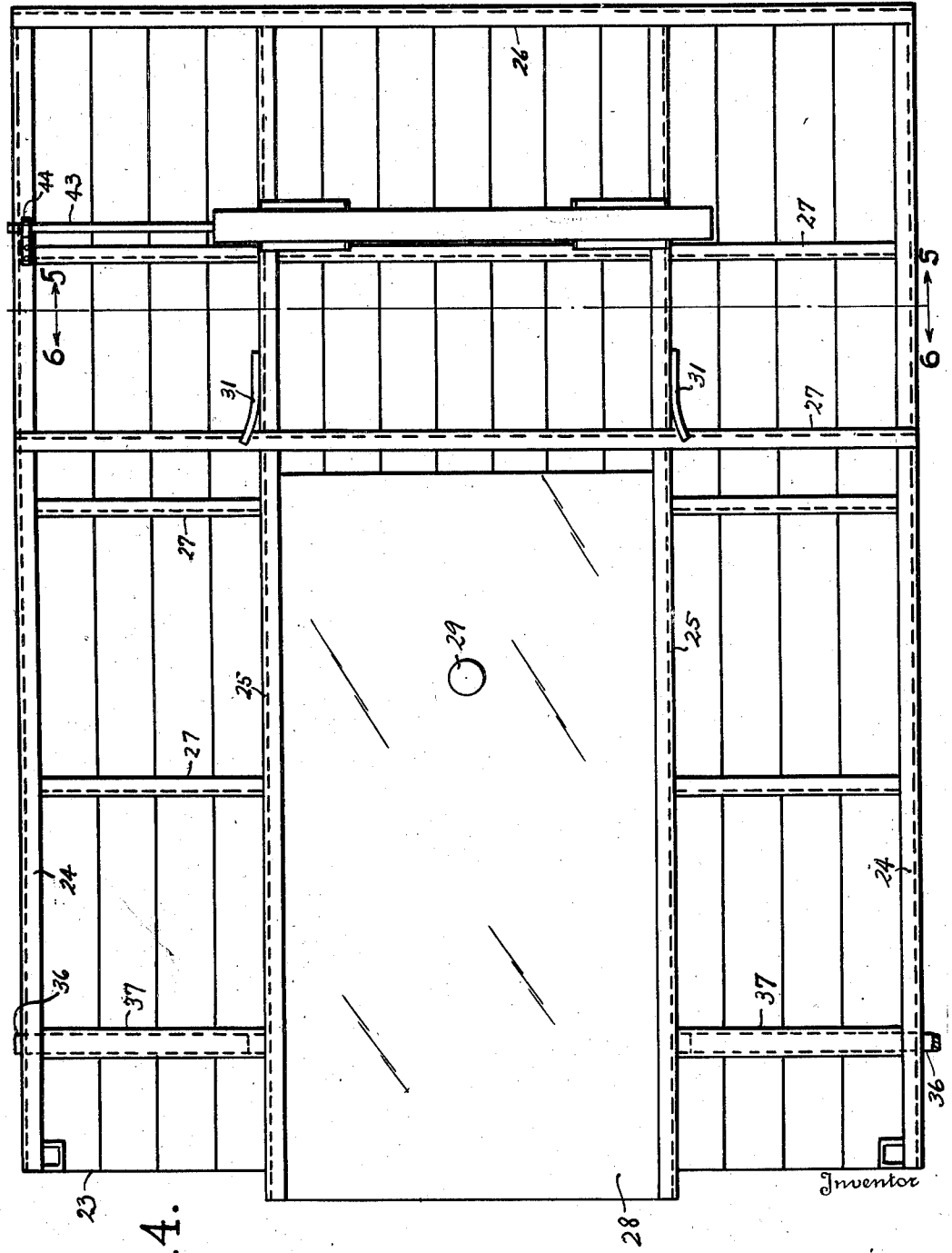
Figure 4 shows a bottom plan view of the body.

The vehicle body is indicated by the numeral 23. A bottom plan view of the body is shown in Figure 4. Its bottom framework comprises the longitudinal side bars 24, whose flanges are turned inwardly as shown in Figures 5 and 6. It also has the intermediate longitudinal channels, 25, 25, extending from the rear end of the body and projecting slightly beyond the forward end thereof as shown in Figure 4. The rear ends of the channels 24 and 25 are connected by means of the cross channel 26 and the bottom framework is suitably reinforced by suitable intermediate cross channels 27. Suitably anchored between the forward ends of the longitudinal channels 25 there is a rectangular metal plate 28 forming an upper fifth wheel. Securely anchored to and depending from the upper fifth wheel 28 there is a coupling pin 29 having an external annular groove 30, therearound.

Depending from the channels 25 behind the upper fifth wheel 28 there are the brackets 31, 31 having the forwardly directed notches 32 to receive the anchor arms 4. The forward ends of the channels 25 are beveled upwardly as at 33 as shown in Figure 1.

As illustrated in Figures 1 and 2, the body is shown detached from the truck with its rear end supported by the legs 34 of the loading platform 35. Its forward end is supported by the detachable legs 36 shown in Figure 2 and also in Figure 7. The upper ends of these supporting legs are inwardly turned into the transversely aligned bearing sleeves 37, 37 which are secured on the underside of the body on opposite sides of the upper fifth wheel 28 as shown in Figure 4.

When the body is mounted on the truck, the truck may be backed up against the loading platform and the rear end of the body will strike against and be elevated by and guided into position by the upwardly inclined faces 38 of the guides 39 which are secured to the upper end of the legs 34. The legs 36 may then have their upper, inwardly directed ends inserted into the bearing sleeves 37 as shown in Figure 7 and when the tractor is detached the body will be supported in loading or unloading position by the legs 34, 36.

When it is desired to load the body onto the truck the truck may be backed into position underneath the body, moving between the legs 36. The lever 21 should then be actuated to release the clamp 15 from the bearing segments 13, whereupon said segments will swing open under the influence of the spring 17 and as the truck moves rearwardly, the coupling pin 29 will be guided into the slot 10 by the rearwardly diverging wings 9, 9 until the coupling pin reaches the forward end of said slot. Meanwhile the upwardly beveled forward ends of the channels 25 will guide said channels over the rollers 5 and the notches 32 will receive the laterally extended arms 4 as shown in Figure 1. Upon release of the lever 21 the spring 17 will move the clamp 15 rearwardly about the bearing segment 13, forcing the same together and seating them in the groove 30 of the coupling pin 29 and locking them securely around said coupling pin, whereby the body will be securely anchored in position on the truck. When in this position the upper fifth wheel 28 will rest firmly on the lower fifth wheel 9, as shown in Figure 1, and the cross bar 27 immediately in front of the brackets 31 will rest on the rear end of the plate 22 while the rear ends of the channels 25 will rest on the corresponding transverse rollers 5. The body will thus have a firm support on the truck.

Means have been provided for taking up the slack between the connected parts so that the body will be held firmly and against movement on the truck frame. For this purpose a transverse channel iron 40 has been secured to the underside of the longitudinal channels 25 as shown more clearly in Figures 1, 2 and 5, with its marginal flanges depending and a plate 41 is welded or otherwise secured to the margins of the depending flanges and aligned underneath the plate 41, and mounted on the side members 1 of the truck frame there is a transverse plate 42. A transverse crank shaft 43 is arranged between the plates 41, 42, as shown more accurately in Figure 5. This crank shaft works in a bearing in the hanger 44 depending from one of the longitudinal channels 24 and its outer end has a hand crank 45 fixed thereon whereby the crank shaft may be turned. On the crank shaft are the sleeves 46, 46 which are mounted against longitudinal movement on said crank shaft, but are mounted so that said crank shaft may turn therein. Spaced from the sleeves 46 and threaded onto the crank shaft are the sleeves 47, 47. Toggle levers 48, 48 are pivoted at one end to the respective sleeves 46 and at their other ends to the plate 41 above and to the shoes 49 beneath. These shoes 49 are arranged over the lower plate 42 and are adapted to rest thereon when the tensioning device is in active position. Toggle levers 50, 50 are pivoted, at one end, to the sleeves 47, and at their other ends to the plate 41 above and to the shoes 49 beneath, all as shown in Figure 5. There are the cross links 51, 51 pivoted at one end to the sleeves 46 and at their other ends to the opposing levers 50 and the cross links 52 pivoted at one end to the sleeves 47 and at their other ends to the opposing levers 48. By this arrangement when the crank shaft 43 is turned in one direction, the sleeves 47 will be moved to operate, through said series of levers, to lift the shoes 49 clear of the plate 42 and when the shaft 43 is turned in the other direction, the sleeves 47 will be moved to operate, through said series of levers to seat the shoes 49 firmly on the plate 42 and a further turning movement of the shaft 43 will slightly elevate the body so as to take up all slack between the connected parts so as to prevent relative movement thereof and to hold the body firmly and against movement on the truck.

When the truck, with the body thereon, is backed up to the loading platform 35, the clamps 53 may be engaged around the under flange of the transverse channel 26 as shown in Figure 2 and the legs 36 may then be installed in place as shown in Figure 7. Thereupon the crank shaft 43 may be turned to lift the shoes 49 away from the plate 42 and the lever 21 may be actuated to release the clamp 15 from the bearing segments 13, whereupon said segments will automatically open and the truck may then be pulled from underneath the body so as to leave the body in the position shown in Figure 2 or 7, ready to be loaded or unloaded and the truck may thereafter be used for other purposes.

When it is again desired to mount the body on the truck the truck may be backed into position underneath the body and the lever 21 actuated to permit the bearing segments 13, 13 to open so that the coupling pin 29 will enter between them. Thereupon the lever 21 may be released so that the clamp 15 will close said bearing segments about the coupling pin and lock them in closed position as hereinabove explained. The shaft 43 may then be turned as above indicated to cause the shoes 49 to seat firmly on the plate 42. The legs 36 may then be removed and the clamps 53 released and the complete vehicle is then ready for service.

The drawings and description disclose what is now considered to be a preferred form of the invention by way of illustration only, while the broad principle of the invention will be defined by the appended claims.

What I claim is:

1. The combination with a truck having a frame, of a body removably mounted on the rear end of the frame and means for elevating the body relative to the frame for taking up the slack between the parts connecting the body to the frame.

2. The combination with a wheeled vehicle having a frame, of a body adapted to be mounted on the rear end of the frame, interconnecting means carried by the frame and body respectively whereby the body may be secured in position on the frame and a tensioning device between the body and frame for elevating the body and taking up the slack between the interconnected parts.

3. In combination a wheeled vehicle having a frame, provided with a lower fifth wheel, rotatable guides on the frame, laterally extended arms on the frame, a body supported on said lower fifth wheel and guides and having brackets shaped to interengage with said arms when the body is in mounted position.

4. In combination a wheeled vehicle having a frame, provided with a lower fifth wheel, rollers in front of the fifth wheel and forming guides on the frame, laterally extended arms on the frame, a body supported on said lower fifth wheel and rollers, having brackets shaped to interengage with said arms when the body is in mounted position, and a coupling pin on the body adapted to be interlocked with said fifth wheel.

5. In combination a wheeled vehicle having a frame, provided with a lower fifth wheel, guides on the frame, laterally extended arms on the frame, a body supported on said lower fifth wheel and guides, having brackets shaped to interengage with said arms when the body is in mounted position and a tensioning device arranged between the body and frame and effective to elevate the body relative to the frame.

6. In a vehicle, a body demountable from the vehicle and having transverse bearings, polygonal in cross section, vertical supporting legs whose upper ends are inwardly turned, said inwardly turned ends being polygonal in cross section and fitted into said bearings and whose lower ends are arranged to rest on the ground.

7. In combination a wheeled vehicle having a frame provided with a lower fifth wheel, guides on the frame in front of said fifth wheel, laterally extended, retracted, arms on and extending each way from, the frame, a body supported on the lower fifth wheel and guides and having brackets positioned to interengage with said arms when the body is in mounted position and a manually operable tensioning device arranged between the body and the frame.

8. In combination a wheeled vehicle having a frame, a body supported on the frame, means for securing the body to the frame, a manually operable tensioning device between the body and the frame and effective when operated to elevate the body relative to the frame.

OTTO H. MENNING.